June 11, 1963 R. E. MOULE 3,092,872
METHOD OF PRODUCING ARTICLES SUCH AS SKINLESS FRANKFURTERS
Original Filed Nov. 21, 1956 2 Sheets-Sheet 1
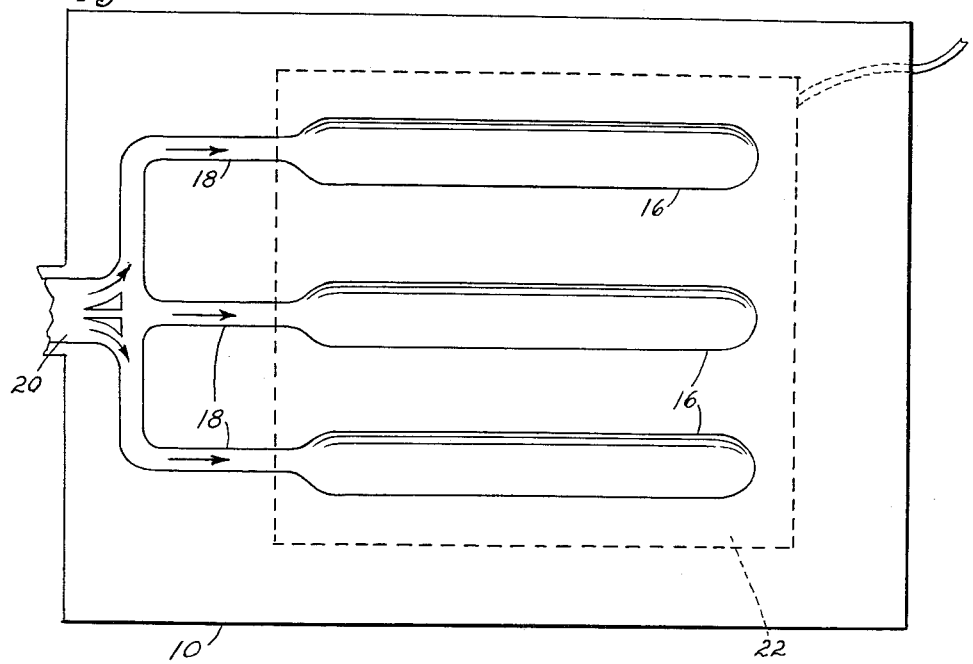
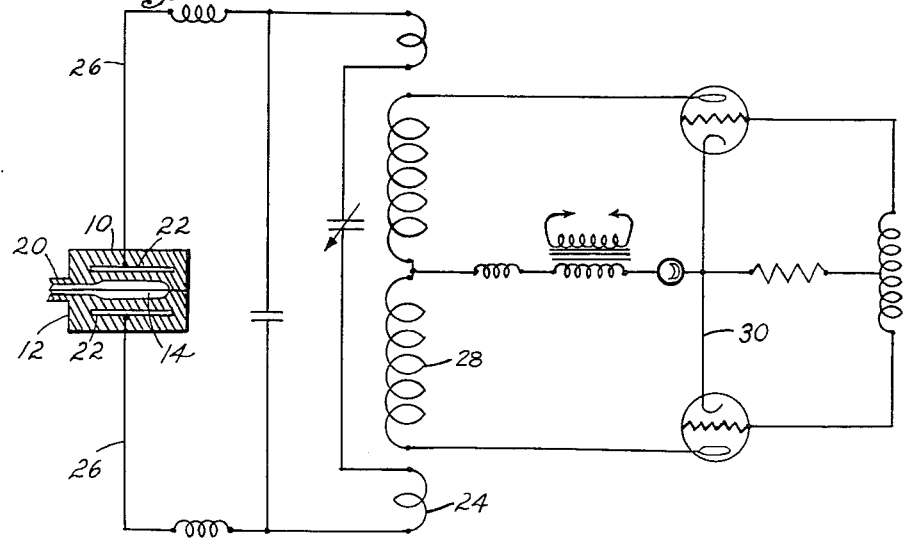
INVENTOR.
Rex E. Moule
BY Chas. R. Fay,
atty.

June 11, 1963 R. E. MOULE 3,092,872
METHOD OF PRODUCING ARTICLES SUCH AS SKINLESS FRANKFURTERS
Original Filed Nov. 21, 1956 2 Sheets-Sheet 2
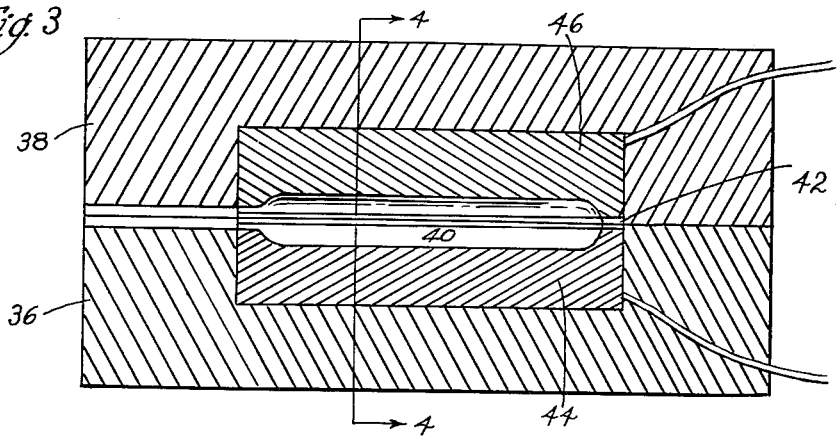
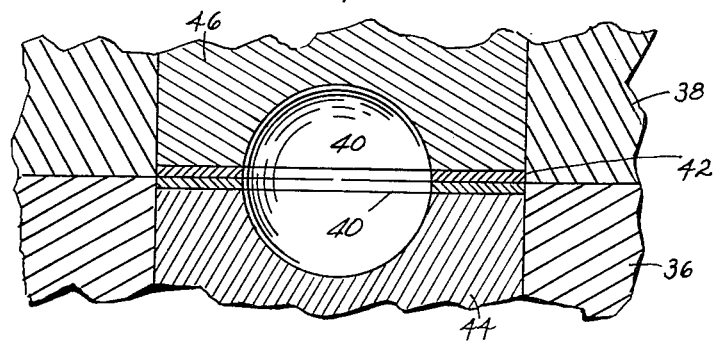
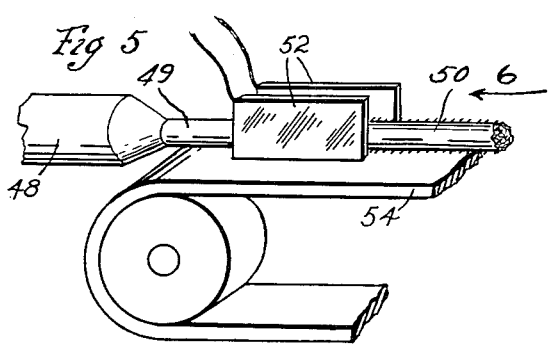
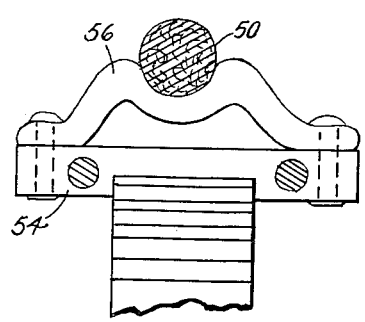
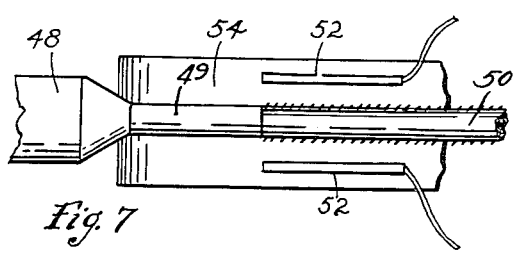
INVENTOR.
Rex E. Moule
BY Chas. R. Fay,
atty.

United States Patent Office 3,092,872
Patented June 11, 1963

1

3,092,872
METHOD OF PRODUCING ARTICLES SUCH AS SKINLESS FRANKFURTERS
Rex E. Moule, 11 Brentwood Drive, Holden, Mass.
Original application Nov. 21, 1956, Ser. No. 623,664, now Patent No. 2,933,758, dated Apr. 26, 1960. Divided and this application Nov. 24, 1959, Ser. No. 855,199
1 Claim. (Cl. 17—45)

This is a division of my prior application Serial No. 623,664 filed by me November 21, 1956, now United States Patent 2,933,758.

This invention relates to a new and improved apparatus and method for the high-speed production of skinless frankfurters or other articles from a mash and directly without the use of any preliminary or intermediate covering or skin of any kind. The invention applies to other food and non-food products as well, and is not limited to frankfurters.

The principal object of the invention resides in the provision of such a frankfurter, etc.; the provision of a skinless frankfurter etc., which may be made and processed in rapid production; the provision of apparatus and method providing for the molding of frankfurters, etc. from a prepared flowable or semi-fluid material or mash containing the ingredients of the frankfurters; the provision of an apparatus for molding and processing the frankfurters at the same time by heating the frankfurters to a temperature suitable for solidifying the same by the use of high-frequency electric current which may be provided by apparatus incorporated directly in a mold of relatively low di-electric resistance for making the frankfurters; or which may be provided in apparatus processing the frankfurters, and subsequent to the molding operation, resulting in either event in completely finished skinless frankfurters in condition ready for sale.

Other objects and advantages of the invention will appear hereinafter.

Reference is to be had to the accompanying drawings, in which

FIG. 1 is a view of a part of a mold in which the frankfurters are made and heated;

FIG. 2 is a longitudinal section on a reduced scale taken through the complete mold;

FIG. 3 is a longitudinal section through the mold illustrating a modification;

FIG. 4 is an enlarged section on line 4—4 of FIG. 3;

FIG. 5 is a fragmentary perspective view illustrating a modified method of molding the frankfurters and heating the same;

FIG. 6 is a view in elevation, partly in section, looking in the direction of arrow 6 in FIG. 5 but showing a modification; and FIG. 7 is a plan view of the apparatus shown in FIG. 5.

In carrying out the present invention, the same may be illustrated as involving the use of a mold which may conveniently comprise a molding plate or block 10 of material having a complementary molding plate or block 12 for cooperating therewith somewhat in the manner of molds used in the plastic injection molding industry. The two mold plates 10 and 12 together provide a cavity 14 which is formed in the desired shape of the frankfurter or other article and part of which is formed in each mold plate as indicated at 16 in FIG. 1.

There may be as many cavities as desired and each cavity is provided with an inlet generally indicated at 18, these coming together at the sprue 20 represented as deriving the material directly from an injection molding machine or some convenient device for inserting the semi-fluid material or mash into the molds, so that the articles are formed to the shape shown. Of course after the frankfurters, etc. are processed, the gates or sprues which are formed in the passages 18 are cut off. Any means may be used for providing the pressure by which the molds are filled with the material.

As shown in FIGS. 1 and 2, there is provided as for instance in each mold block 10 and 12, an electrode or plate, these being indicated at 22.

The plates are in turn connected across the secondary 24 of a transformer, which transformer has a primary 28 connected as shown in the diagram to a tube circuit 30 capable of inducing high-frequency current across the plates 22. Preferably, the frequency of the current passing between plates is maintained on a high order of frequency in the neighborhood of 50 megacycles as an example.

The di-electric resistance of the material in the molds produces heat to the desired temperature for rendering the same more solid and in a condition to permanently retain the shape of the frankfurters in individual elements without the need for having any skin around the same. When the frankfurters, etc. have been thus heated for a very short period of time, the mold may be opened and the frankfurters etc. abstracted in a manner comparable to that used in the molding industry for plastics and other materials. The heat may of course be controlled to any desired degree such as may be necessary to cook the articles if they are food products but in any event to solidify the formed materials or mash to a solid enough state where they will maintain their own shape when cooled, and this is true whether the articles are of food or non-food nature.

As shown in FIGS. 3 and 4, there are a pair of mold plates 36 and 38 having the cavities 40 therein as before but in this case the cavities are embedded directly in the mold plates and themselves form the mold cavity, so that there is no necessity for the high frequency induced current passing through the material of the mold as is shown in FIG. 2. However, in the case of FIGS. 3 and 4, it is of course necessary to provide a circumferential insulator means as at 42 between the electrodes 44 and 46. FIGS. 3 and 4 merely illustrate a slightly different apparatus from that shown in FIGS. 1 and 2 and it is to be understood that the skinless frankfurters or other articles may be formed and heated in many different ways without departing from the scope of the invention.

Another way in which the articles may be formed and processed is to provide a tank or hopper having a nozzle 48 with pressure means forcing the semi-fluid ingredients or mash therefrom resulting in an endless length of uncooked frankfurter 50. This is then passed between a pair of high-frequency electrode plates 52 more or less as above described with reference to FIG. 2. This results in heating the ingredients and forming the skinless endless length of frankfurter or other material which may then be severed in any desired lengths.

It is necessary to provide a support such as a traveling belt 54 for the purpose of supporting the advancing frankfurter strip and in some cases it is preferable to provide a shaped top surface such as shown at 56 wherein the conveyor is provided with a concaved upper surface in which the formed material may rest while the shape thereof is maintained during heating.

Having thus described my invention and the advantages thereof, I do not wish to be limited to the details herein disclosed, otherwise than as set forth in the claim, but what I claim is:

The method of making a solid product from a comminuted semi-fluid mesh of ingredients in the absence of any container or outer skin therefor comprising the steps of continuously molding the ingredients of the product and subjecting the molded food product to a high frequency electric current sufficient to cause the material to be heated to a setting temperature wherein the heating step and the molding step are separate.

References Cited in the file of this patent

UNITED STATES PATENTS

| | | |
|---|---|---|
| 2,401,991 | Walton et al. | June 11, 1946 |
| 2,651,808 | Burnett et al. | Sept. 15, 1953 |
| 2,685,518 | Prohaska | Aug. 3, 1954 |
| 2,877,118 | Hensgen et al. | Mar. 10, 1959 |